US007117576B2

(12) United States Patent
LaSusa

(10) Patent No.: US 7,117,576 B2
(45) Date of Patent: Oct. 10, 2006

(54) METHOD AND PROCESS OF A UNIVERSAL WINDOW SYSTEM USING SINGULAR ADVANCED COMPONENTS OF A POLYMER BASED OR METALLURGY BASED PRODUCT

(75) Inventor: Frank LaSusa, Clinton, UT (US)

(73) Assignee: VinylLink, LLC, Layton, UT (US)

( * ) Notice: Subject to any disclaimer, the term of this patent is extended or adjusted under 35 U.S.C. 154(b) by 0 days.

(21) Appl. No.: 10/175,021

(22) Filed: Jun. 18, 2002

(65) Prior Publication Data

US 2003/0229980 A1 Dec. 18, 2003

(51) Int. Cl.
*B23P 25/00* (2006.01)

(52) U.S. Cl. ......................... 29/458; 29/897; 29/897.3; 700/159; 700/167; 700/117; 83/917

(58) Field of Classification Search .................. 29/458, 29/897, 897.3; 52/565.5, 658, 786.13; 700/117, 700/159, 167, 190, 194; 83/917
See application file for complete search history.

(56) References Cited

U.S. PATENT DOCUMENTS 2,037,611 A 4/1936 Antrim ........................ 52/568
2,047,835 A 7/1936 Prew .......................... 294/172
2,126,544 A 8/1938 Everhard ..................... 52/658
2,219,594 A 10/1940 Lang ........................... 49/504
2,781,111 A 2/1957 Kunkel ........................ 49/434
2,952,342 A 9/1960 Schnittker .................... 52/658
3,074,772 A 1/1963 Kessler et al. .............. 312/204
3,087,207 A 4/1963 Styra ......................... 52/309.1
3,287,041 A 11/1966 Cohen ......................... 52/658
3,305,998 A 2/1967 Deisenroth ................. 52/656.6
3,315,431 A 4/1967 Yake ....................... 52/800.12
3,327,766 A 6/1967 Kurtz ......................... 160/381
3,348,353 A 10/1967 Cartagena .................... 52/658
3,376,670 A 4/1968 Jones .......................... 49/501
3,484,126 A 12/1969 Hook .......................... 52/658
3,802,105 A * 4/1974 Bendix ........................ 40/785
3,803,960 A * 4/1974 Pearl et al. ..................... 83/56
3,854,248 A 12/1974 Dayus ......................... 49/504
3,855,887 A * 12/1974 Pearl et al. ..................... 83/49
3,864,997 A * 2/1975 Pearl et al. ..................... 83/49
4,064,644 A * 12/1977 Warner et al. ................ 40/782
4,269,255 A * 5/1981 Nailor et al. ............... 160/381
4,327,142 A 4/1982 Norzi ......................... 428/198
4,407,100 A 10/1983 Huelsekopf .................. 52/212
4,460,737 A 7/1984 Evans et al. ................ 524/584
4,574,553 A 3/1986 Lisec .......................... 52/658
4,597,232 A 7/1986 Lingemann .................. 52/304
4,740,397 A * 4/1988 Santo .......................... 428/12
4,941,288 A 7/1990 Morton ........................ 49/504
5,155,956 A 10/1992 Norment et al. .............. 52/217
5,189,841 A 3/1993 Arbetter ....................... 49/504
5,456,099 A * 10/1995 Lipari ........................... 72/131
5,491,940 A 2/1996 Bruchu ........................ 52/213

(Continued)

FOREIGN PATENT DOCUMENTS

JP 01064794 A * 3/1989

(Continued)

*Primary Examiner*—Essama Omgba
(74) *Attorney, Agent, or Firm*—Snell & Wilmer LLP

(57) ABSTRACT

A method for producing window components using polymer based, metallurgy based, extruded, injection molded, or wood material is provided. This invention provides a low cost, highly reliable, low defect method of producing window components by machining from a singular piece of material, providing bendable portions, with angled portions adapted to fit together to define a wide range of window shapes and sizes.

24 Claims, 5 Drawing Sheets

U.S. PATENT DOCUMENTS

| | | | | | |
|---|---|---|---|---|---|
| 5,540,019 | A | | 7/1996 | Beske et al. | 52/204.5 |
| 5,555,684 | A | | 9/1996 | Galowitz et al. | 52/204.5 |
| 5,585,155 | A | | 12/1996 | Heikkila et al. | 428/36.7 |
| 5,603,585 | A | | 2/1997 | Bruchu et al. | 403/382 |
| 5,620,648 | A | | 4/1997 | Volkmann et al. | 264/511 |
| 5,622,017 | A | | 4/1997 | Lynn et al. | 52/209 |
| 5,714,234 | A | * | 2/1998 | Robertson | 428/195.1 |
| 5,724,246 | A | * | 3/1998 | Heil | 700/167 |
| 5,799,453 | A | | 9/1998 | Westerlund | 52/259 |
| 5,901,509 | A | | 5/1999 | Rose | 52/209 |
| 5,943,933 | A | * | 8/1999 | Evans et al. | 83/522.19 |
| 5,970,769 | A | * | 10/1999 | Lipari | 72/131 |
| 6,047,514 | A | | 4/2000 | Verch | 52/656.5 |
| 6,063,458 | A | * | 5/2000 | Robertson et al. | 428/13 |
| 6,073,412 | A | | 6/2000 | Verch | 52/656.5 |
| 6,266,940 | B1 | * | 7/2001 | Reichert | 52/786.13 |
| 6,295,788 | B1 | * | 10/2001 | Reichert | 52/786.13 |
| 6,313,433 | B1 | * | 11/2001 | Sukman et al. | 219/121.67 |
| 6,329,030 | B1 | * | 12/2001 | Lafond | 428/34 |
| 6,377,864 | B1 | * | 4/2002 | Lindstrom | 700/96 |
| 6,423,935 | B1 | * | 7/2002 | Hackel et al. | 219/121.85 |
| 6,678,934 | B1 | * | 1/2004 | LaSusa | 29/458 |
| 6,954,676 | B1 | * | 10/2005 | Dorsch | 700/95 |
| 2002/0048822 | A1 | * | 4/2002 | Rittenburg et al. | 436/518 |

FOREIGN PATENT DOCUMENTS

WO WO 2004110786 A2 * 12/2004

* cited by examiner

METHOD AND PROCESS OF A UNIVERSAL WINDOW SYSTEM USING SINGULAR ADVANCED COMPONENTS OF A POLYMER BASED OR METALLURGY BASED PRODUCT

CROSS REFERENCE TO RELATED APPLICATIONS

This application is based on U.S. patent application Ser. No. 09/679,220, filed on Oct. 3, 2000, now U.S. Pat. No. 6,678,934, which in turn is based on Provisional Patent Application Ser. No. 60/157,625, which was filed on Oct. 4, 1999, and priority is claimed thereto.

BACKGROUND OF INVENTION

1. Field of the Invention

This invention relates to the manufacture of window systems. More specifically, this invention relates to the manufacture of window systems using polymer based or metallurgy based component parts.

2. Description of Related Art

A variety of methods and processes for the construction of window system assemblies have been proposed. Typically, these prior methods and processes require costly, complex, inconsistent, error and waste prone, susceptible to defects manufacturing steps. Generally, these prior methods and processes require a large number of pieces of equipment and skilled craftsmen. For general background, the reader is directed to the following United States patent Nos., each of which is hereby incorporated by reference in its entirety for the material contained therein: U.S. Pat. Nos. 2,037,611, 2,047,835, 2,219,594, 2,781,111, 2,952,342, 3,074,772, 3,087,207, 3,287,041, 3,305,998, 3,315,431, 3,327,766, 3,348,353, 3,376,670, 3,484,126, 3,802,105, 3,854,248, 4,269,255, 4,327,142, 4,407,100, 4,460,737, 4,597,232, 4,941,288, 5,155,956, 5,189,841, 5,491,940, 5,540,019, 5,555,684, 5,585,155, 5,603,585, 5,620,648, 5,622,017, 5,799,453, 5,901,509, 6,047,514 and 6,073,412. The reference to related U.S. patent documents is not an admission of prior art, as the inventor's date of invention may predate the date of filing and/or publication of these references.

SUMMARY OF INVENTION

It is desirable to provide a method and process of the manufacture of window systems that make use of singular advanced components of a polymer based or metallurgy based window system and that minimize complexity, cost, product inconsistencies, defects, while producing a universal window system using largely automated procedures and advanced materials.

Therefore, it is a general object of this invention to provide a method and process for the construction of universal window systems, using advanced components of a polymer based or a metallurgy based product.

It is a further object of this invention to provide a method and process for the construction of universal window systems that reduces labor costs.

It is a still further object of this invention to provide a method and process for the construction of universal window systems that reduces the defects of the window system products.

Another object of this invention is to provide a method and process for the construction of universal window systems that makes use of automation techniques to improve product quality.

A further object of this invention is to provide a method and process for the construction of universal window systems that produces window components in a singular form.

A still further object of this invention is to provide a method and process for the construction of universal window systems that works with extruded, injected, or other composite derived materials.

These and other objects of this invention will be readily apparent to those or ordinary skill in the art upon review of the following drawings, detailed description and claims. In the preferred embodiment of this invention, the method and process of this invention are described as follows.

BRIEF DESCRIPTION OF DRAWINGS

In order to show the manner that the above recited and other advantages and objects of the invention are obtained, a more particular description of the preferred embodiment of this invention, which is illustrated in the appended drawings, is described as follows. The reader should understand that the drawings depict only a present preferred and best mode embodiment of this invention, and are not to be considered as limiting in scope. A brief description of the drawings is as follows.

Reference will now be made in detail to the present preferred embodiment of the invention, examples of which are illustrated in the accompanying drawings.

DETAILED DESCRIPTION

Figure 1A:
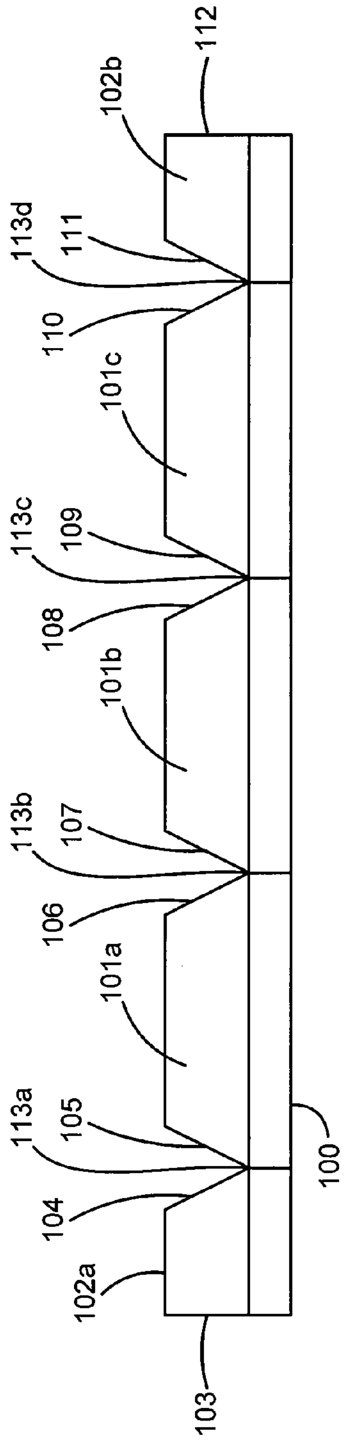
FIG. 1*a* is a window component profile, manufactured using the process of this invention.
Figure 3B:
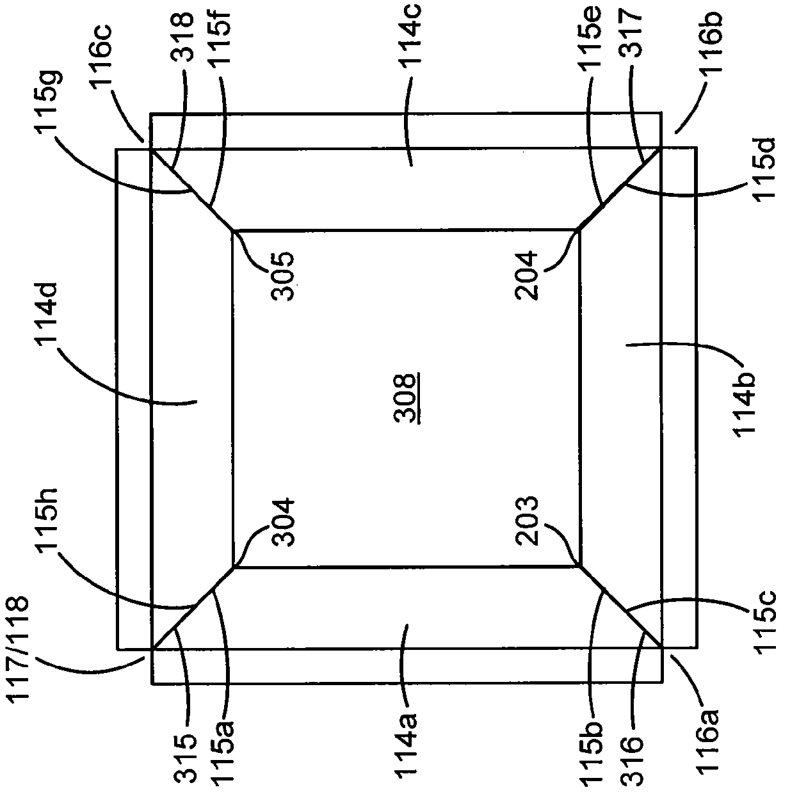
FIG. 3*b* is an alternative completed window component in the final stage ready for installation.
Figure 3A:
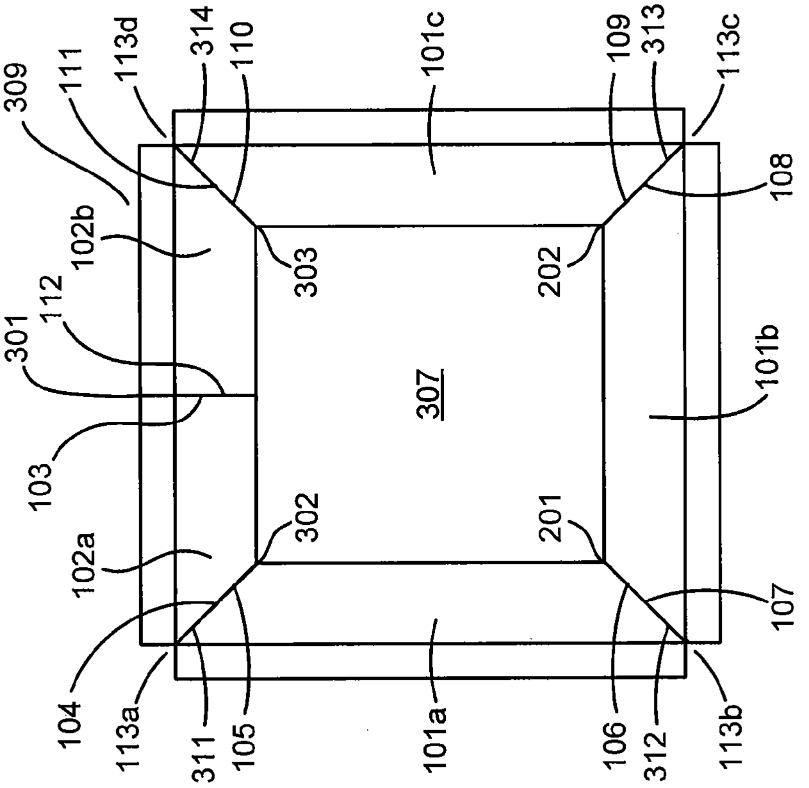
FIG. 3*a* is a completed window component in the final stage ready for installation.

FIG. 1*a* shows a window component profile, manufactured using the process of this invention. This preferred embodiment of the window component has three generally elongate sections 101*a*, 101*b*, 101*c* and two half sections 102*a*, 102*b*, each connected 113*a*, 113*b*, 113*c*, 113*d* to an adjacent section. In alternative embodiments, when it is desired to have windows with non-rectangular shapes, the number of sections can be increased or reduced. For example, a triangular shaped window may have only two long sections and two half sections. In another example, an octagonal shaped window may have seven long sections and two half sections. The connections 113*a*, 113*b*, 113*c*, 113*d* are flexible permitting a bend at the connection 113*a*, 113*b*, 113*c*, 113*d*. The preferred elongate sections 101*a*, 101*b*, 101*c* and half sections 102*a*, 102*b* are preferably made of a composite material, molded, cut, milled, routed or otherwise shaped in to the desired generally decorative shape. While the sections 101*a*, 101*b*, 101*c* are shown, in this embodiment, as being of generally the same length, in alternative embodiments, the sections 101*a*, 101*b*, 101*c* may have different lengths as appropriate to the desired window shape. Each section 101*a*, 101*b*, 101*c* is provided with two diagonal cut sloped portions (respectively 105, 106; 107, 108; and 109, 110). These diagonal cut sloped portions 105, 106, 107, 108, 109, 110 are shown having an angle of 45 degrees, however, in alternative embodiments this angle may be either increased or decreased as necessary in order to facilitate the joining of two adjacent diagonal sloped portions, to thereby produce a window component having the desired shape. The ends 103 and 112 are, in this embodiment, at approximately 90 degrees from the base 100 of the window portions, thereby facilitating the joining of the ends 103, 112, as shown in FIG. 3*a*.

Figure 1B:
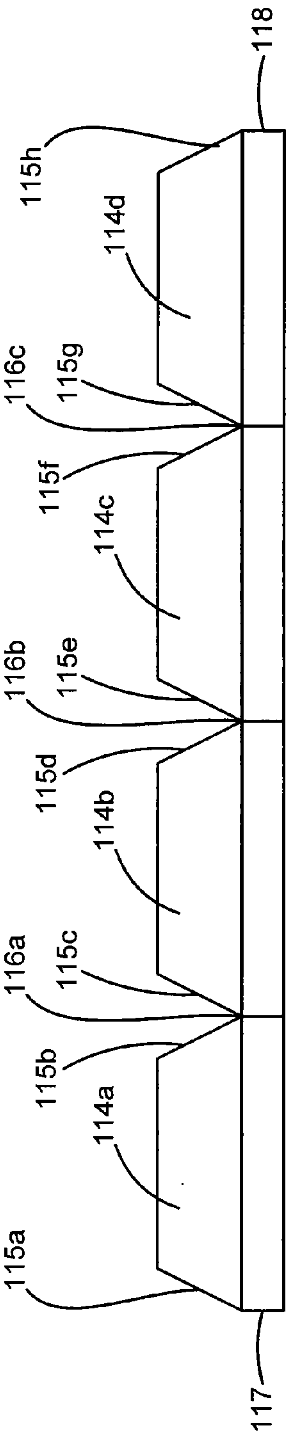
FIG. 1*b* is an alternative window component profile, manufactured using the process of this invention.

FIG. 1*b* shows an alternative window component profile, manufactured using the process of this invention. This second preferred embodiment of the window component has four generally elongate sections 114*a*, 114*b*, 114*c*, 114*d* each connected 116*a*, 116*b*, 116*c* to an adjacent section. In alternative embodiments, when it is desired to have windows with non-rectangular shapes, the number of sections can be increased or reduced. For example, a triangular shaped window may have only three long sections. In another example, an octagonal shaped window may have eight long sections. The connections 116*a*, 116*b*, 116*c* are flexible permitting a bend at the connection 116*a*, 116*b*, 116*c*. The preferred elongate sections 114*a*, 114*b*, 114*c*, 114*d* are preferably made of a composite material, molded, cut, milled, routed or otherwise shaped in to the desired generally decorative shape. While the sections 114*a*, 114*b*, 114*c*, 114*d* are shown, in this embodiment, as being of generally the same length, in alternative embodiments the sections 114*a*, 114*b*, 114*c*, 114*d* may have different lengths, as appropriate for the desired window shape. Each section 114*a*, 114*b*, 114*c*, 114*d* is provided with two diagonal cut sloped portions (respectively 115*a*, 115*b*; 115*c*, 115*d*; 115*e*, 115*f*; 115*g*, 115*h*). These diagonal cut sloped portions 115*a*, 115*b*, 115*c*, 115*d*, 115*e*, 115*f*, 115*g*, 115*h* are shown having an angle of 45 degrees, however, in alternative embodiments this angle may be either increased or decreased as necessary in order to facilitate the joining of two adjacent diagonal sloped portions, to thereby produce a window component having the desired shape. The joining of the ends 117, 118 are as shown in FIG. 3*b* to form the complete window component.

Figure 2B:
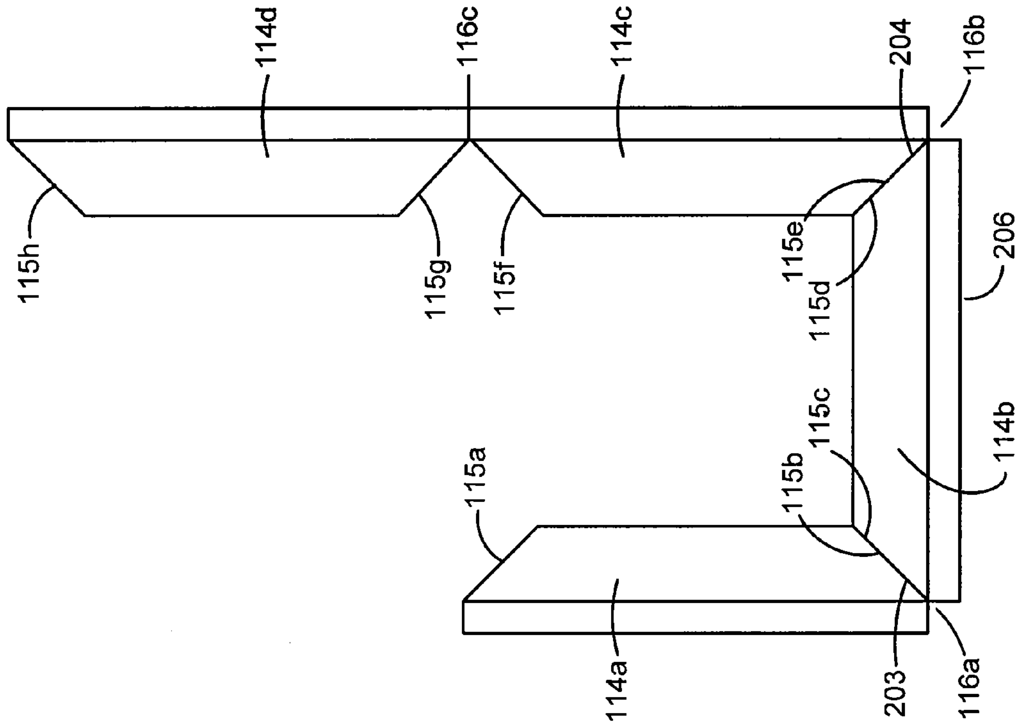
FIG. 2*b* is an alternative window component profile in the rotational stage of the process of this invention.
Figure 2A:
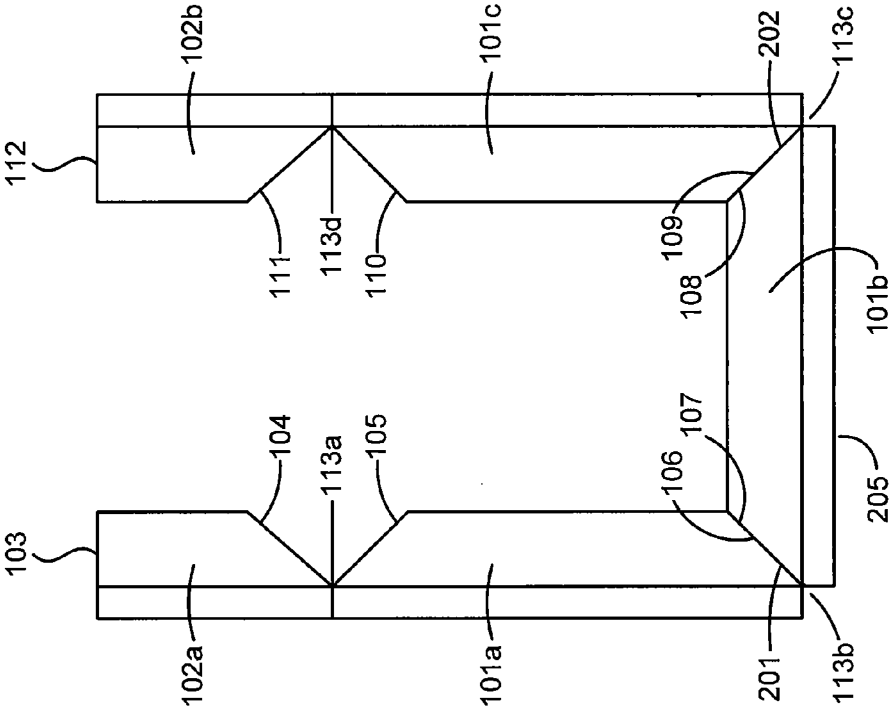
FIG. 2*a* is a window component profile in the rotational stage of the process of this invention.

FIG. 2*a* shows a window component profile in the rotational stage of the process of this invention. This view shows the window component of FIG. 1*a*, with the diagonal sloped portions 106, 107 and 108, 109 brought into contact and joined to form corners 201, 202 and thereby the bottom 205 of the window component.

FIG. 2*b* shows an alternative window component profile in the rotational stage of the process of this invention. This view shows the window component of FIG. 1*b*, with the diagonal sloped portions 115*b*, 115*c* and 115*d*, 115*e* brought into contact and joined to form corners 203, 204 and thereby the bottom 206 of the window component.

FIG. 3*a* shows a completed window component in the final stage ready for installation of the window component of FIG. 1*a*. Ends 103 and 112 are connected forming a joint 301 at the top 309 of the window component. Diagonal sloped portions 104, 105 and 110, 111 are brought into contact and joined to form corners 302 and 303 and to define an interior 307 suitable for holding and retaining glass or other similar transparent or semi-transparent material. The joints 301, 311, 312, 313, 314 are typically and preferably made using adhesive, although alternatives such as bolts, screws, pins, clips and the like can be substituted without departing from the concept of this invention.

FIG. 3*b* shows a completed window component in the final stage ready for installation of the window component of FIG. 1*b*. Ends 117 and 118 are connected forming a joint 315 of the diagonal sloped portions 115*a*, 115*h*, thereby forming a corner 304. Diagonal sloped portions 115*f*, 115*g* are brought into contact and joined to form corner 305 and to define an interior 308 suitable for holding and retaining glass or other similar transparent or semi-transparent material. The joints 315, 316, 317, 318 are typically and preferably made using adhesive, although alternatives such as bolts, screws, pins, clips and the like can be substituted without departing from the concept of this invention.

Figure 4:
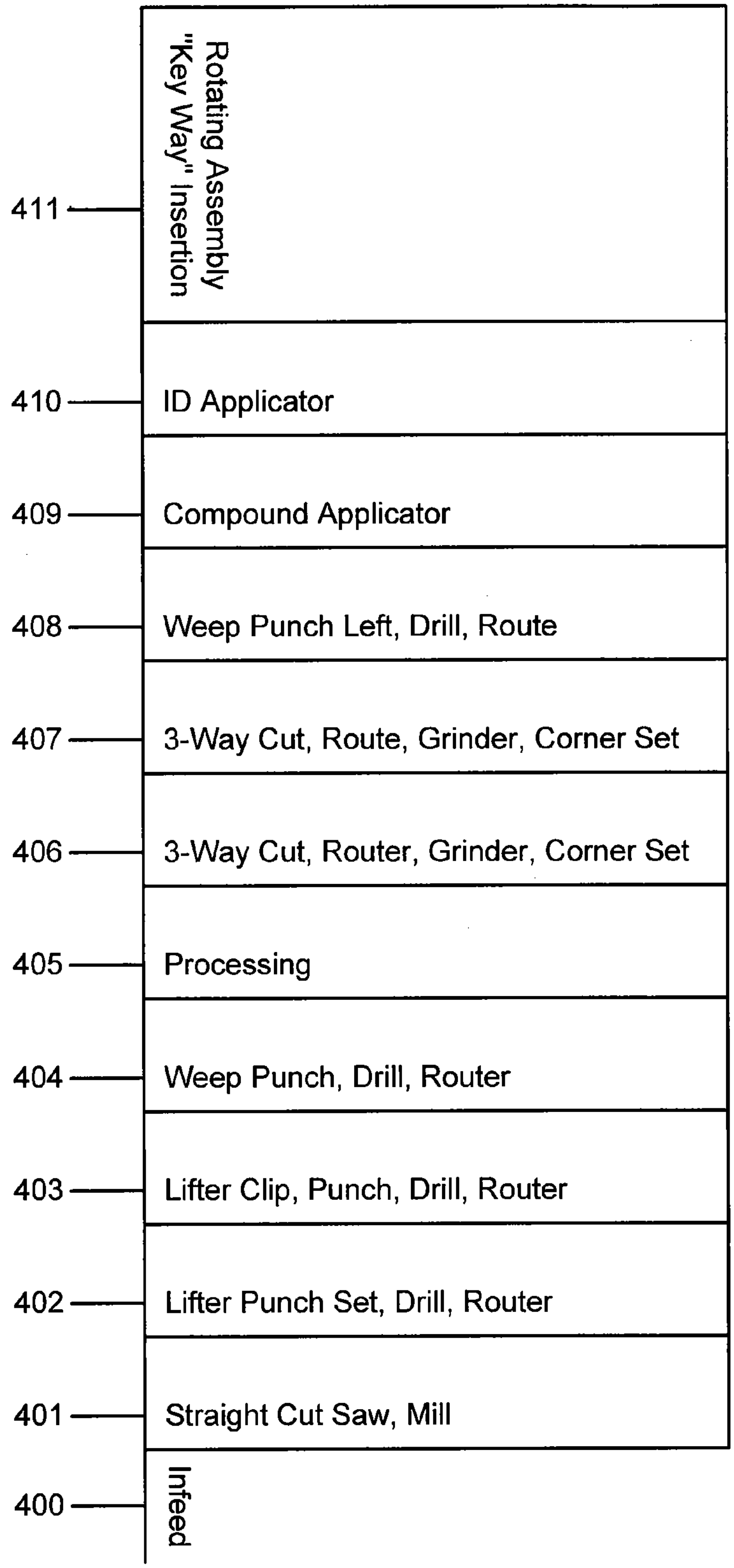
FIG. 4 is a process flow diagram of the preferred method of this invention.

FIG. 4 shows a process flow diagram of the preferred method of this invention. Initially, the material is fed 400 into the assembly process. Next, the material is straight cut 401 preferably by a saw or mill machine. The cut material is set 402 for Lifter or Balance Holding punch, preferably on a drill or router machine. The material is then punched 403 for the lifter clip, also preferably on a drill or router machine. Weep punching 404 is next performed on the material, again typically using a punch, drill or router machine. These punching steps are used to provide ventilation and drainage points in the window component. Miscellaneous processing 405 is performed to remove loose material and/or rough edges. A first three-way cut, or notch, 406 is made, to produce diagonal portions, preferably using a cutter, grinder, or corner set. A second three-way cut 407 is made, to produce additional diagonal portions, also preferably using a cutter, grinder or corner set. A second weep punch 408 is made to further provide additional drainage and ventilation, preferably using a drill or router machine. A polymer compound is applied 409 to the joint regions thereby providing durable, flexible corners. Identification markings are applied 410 to permit control and tracking of window components. The assembly or window component is rotated with the corner and/or end portions joined together using adhesive, screws, bolts, clips, pins or the like forming the complete window component ready for the insertion of the transparent medium and for installation in the building structure.

Figure 5:
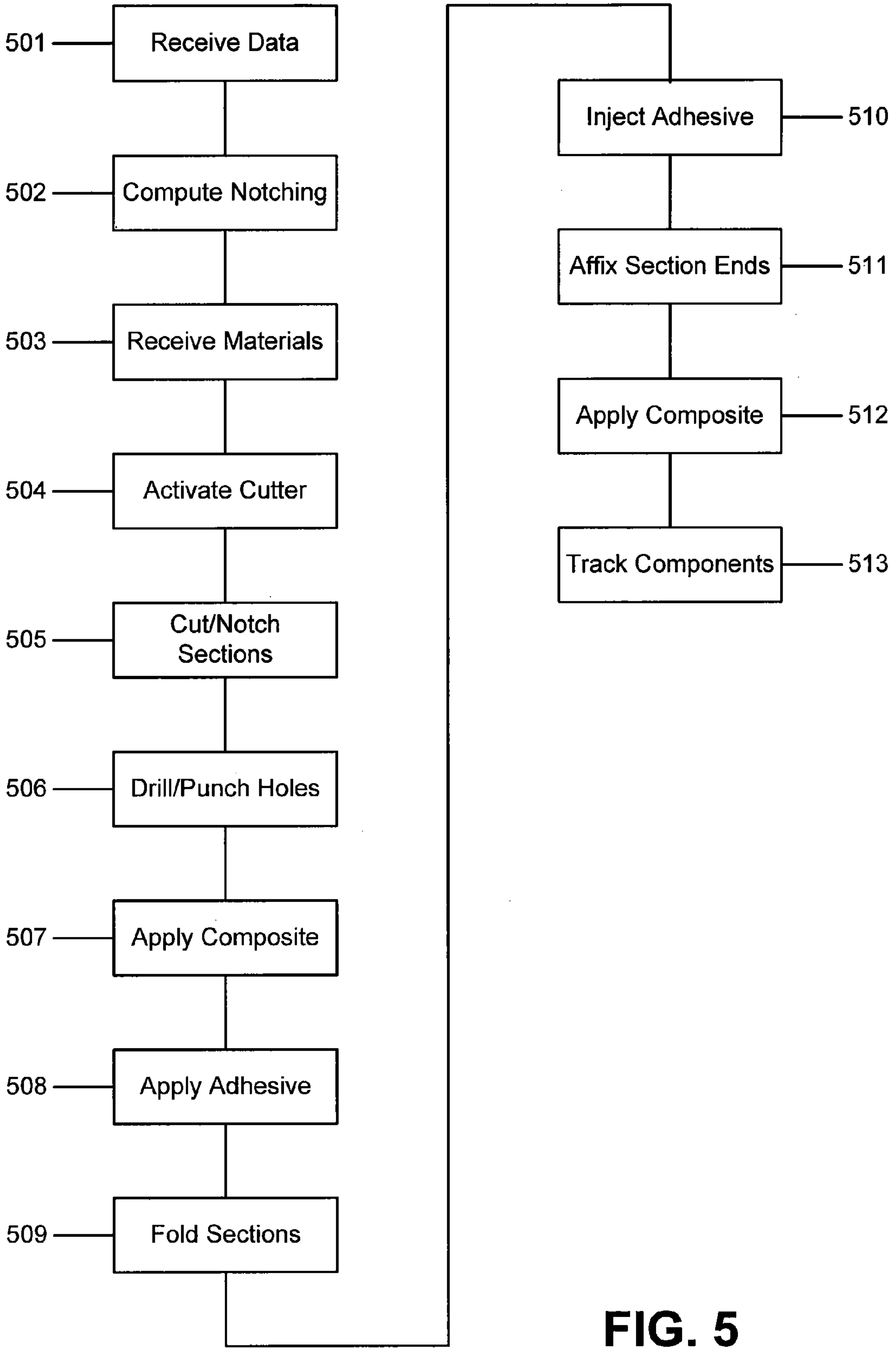
FIG. 5 is a detailed flow chart of the present, typically although not necessarily automated, process of this invention.

FIG. 5 shows a detailed flow chart of the present, typically although not necessarily automated, process of this invention. This present embodiment of the invention may employ automation techniques and technology to improve the quality and consistency of the manufacturing process while simultaneously reducing labor and material costs. Although the steps of the process shown in this FIG. 5 accommodate automation technology, the reader should understand that in alternative envisioned embodiments, the steps can be performed in a manual fashion. Data profiles are received 501 by a control processor. A typical control processor is a programmable computer, although alternative processors, such as single purpose electronic devices could be substituted without departing from the concept of this invention. The data profiles include information related to the desired window shape, size, texture, color, frame material (also referred to herein as construction material), glass or other medium type and/or other features typically specified in the construction of window frames. Frame window materials are typically selected from but are not necessarily limited to composites, plastic, metal, and wood reinforced with a foldable back portion. Textures include patterns, roughness and the like in the surface of the construction material. Window shapes supported by this invention include square, rectangular, triangular, octagonal, and other polygonal shapes, circular, oval and other curved shapes. Moreover, the window shapes may be either an irregular or normal polygon, and includes trapeziums, half rounds, and ellipses. The data profile also typically includes dimensional information, such as height, width and thickness of desired frame(s). This dimensional information may be input, or received by the processor in various units, including either English units (inches, feet, yards) and/or metric units (centimeters, meters). The data profile also includes information concerning the type and size of desired transparent, or semi-transparent, material. Typically, this material is glass, although plastic, acrylic, composite or other generally transparent, window compatible material can be substituted without departing from the concept of this invention. Also, typically described in the data profile is the frame material, color and texture used and desired, as well as such other window-type features, such as single pane windows, double pane windows, horizontal sliders, single or double hung sliders, patio doors, shaped windows, picture windows, and other types of windows known in the art.

The control processor, which may be a distributed processor in communication with a processor receiving the data, a separate processor computing, and a still other processor controlling the manufacturing equipment and perhaps a further processor tracking the process of the window components through the process of this invention, computes 502 the cutting and notching of the received material. This computation step 502 preferably includes calculating the length of window frame components (which will be produced from the received material), calculates and/or selects the positioning of the notches within each window frame component, as well as the angle of the sloped or "notch" portion as well as the distance between notches. In general, for a regularly shaped square or rectangular window, the notch angles would be 45 degrees and the number of elongated sections would be four, while for an octagon the notch angles would be 22.5 degrees and the number of elongated sections would be eight. In order to provide certain curved window shapes the notch angles may also be non-linear. The notch angles are selectable generally from 0 degrees to 180 degrees to provide for a selection of a generally continuous set of window shapes. The number of notch angles is also selectable, with four angles in each notch being typical. The data treatment calculation may include tolerance ranges from 0.000 inches to 0.500 inches to account for potential stretching of various construction materials. Construction materials are received 503. Typically, these construction materials are received in a single piece form and often have a nail fin provided on the outer surface area. A cutter is provided to perform the cutting operation for cutting the received construction materials to the required length of the window frame component and to create the notches defining the sections (also referred to as elongated sections) of the window component. Typically, this cutter is a mill, router, saw, compression metal cutter, high-pressure water jet cutter, heat or torch cutter, and the like. A wide variety of construction materials may be used with this invention, including, but not necessarily limited to vinyl, plastic, polymers, wood, metal, fiberglass and/or other composite materials. Once the construction materials are received 503, the processor activates 504 the cutter using the notching sequences previously calculated to perform the cutting and notching sequences on the construction material to produce a linear physical profile. In the present embodiment this activation 504 is a batch computation process. In the present embodiment, a mill cuts 505 the construction material to length and cuts the angled notches in the construction material to define the sections. In one present embodiment the angled notches are made sequentially, in other embodiments multiple angled notches are made simultaneously or at least with several cutters operating independent from each other. In one embodiment of the process movement of the construction material is done automatically, while in other embodiments, a person may be required or prompted to move the material as required to position for angled notching. In some embodiments, the angled notches define sections of equal length, in other embodiments; the angled notches define sections of unequal length. Typically, a three-way notch or cut is provided to produce the diagonal partial cut-through notches of the present embodiment. Drilling or punching 506 operations may then be performed to introduce openings in the construction material for drainage, air filtration, placement of hardware, routing of conduit and/or dimpling. A composite material may then be applied 507 to the surface of the construction material to improve flexibility, durability and weather proofing of the resulting frame. The selected composite material applied is selected to be appropriate to the construction material, and is typically a polymer compound with high temperature tolerance and moisture resistance. An adhesive material, typically a chemical or polymer adhesive, is applied 508 to the angled notch portions to assist in the adhesion of the after folded corners. After the typically batch system has completed cutting operations 505, the construction material is folded 509 to form one or more corners from the ends of the individual sections. During and/or after the folding step 509 additional adhesive may be injected to provide a seal in the folded corners. After folding 509, the construction material takes on the shape of the desired window shape, such as a square, rectangle or other selected shape identified in the received 501 data, and an interior adapted to hold in place the selected transparent medium. The selected transparent medium is typically glass, although alternatives including plastic, acrylic and other similar transparent or semi-transparent materials can be substituted without departing from the concept of this invention. In an alternative embodiment, the construction material is folded 509 after each angled notch cutting operation 505, so that with each fold, the appearance of the material increasingly resembles the desired shape and selected data profile. A second typically polymer composite, typically adhesive, material is injected 510 in each corner thereby affixing the construction material in the desired shape. This second polymer composite also enhances the seal in the corners and may be used to retain the transparent medium in place in the interior of the frame component. After folding the section ends, including the ends (see 103 and 112 of FIG. 1*a*) of the component and the angled notches (cumulatively now corners) are fixed 511 in place, typically through the injection of the second polymer, through the use of the adhesive of step 508 or alternatively by the use of metal joining or metallurgical process (such as welding and the like) or mechanical fastener devices (such as screws, brackets, bolts and the like). Composite material is typically applied 512 to the exterior portions of the construction material to provide a desired finish to the frame component. Throughout the process of this invention, the components are presently tracked 513 for inventory and quality control purposes. In some embodiments, the tracking 513 may be facilitated by identification marking of the window components, construction materials and/or sections for automatic or manual detection.

The described embodiments of this invention are to be considered in all respects only as illustrative and not as restrictive. Although specific steps and window system components are illustrated and described, the invention is not to be limited thereto. The scope of this invention is, therefore, indicated by the claims. All changes, which come within the meaning and range of equivalency of, the claims are to be embraced as being within their scope.

The invention claimed is:

1. A method of constructing a universal window system, comprising:
(A) receiving materials for processing;
(B) cutting said materials to form a plurality of connected elongated sections, said elongated sections each having a first end and a second end, at lease one of said first and second end of each elongated section being complementary to one of said first and second ends of an adjacent elongated section;
(C) folding said plurality of elongated sections to form one or more corners, the length of each elongated sections being calculated to include a folding stretch tolerance of up to about 0.5 inches per fold; and
(D) affixing said plurality of elongated sections at said one or more corners.

2. A method of constructing a universal window system, as recited in claim 1, further comprising applying a polymer adhesive to said one or more corners.

3. A method of constructing a universal window system, as recited in claim 1, wherein said folding stretch tolerance is between about 0.03 and 0.25 inches.

4. A method of constructing a universal window system, as recited in claim 1, further comprising applying a polymer adhesive to said corners, during said folding step.

5. A method of constructing a universal window system, as recited in claim 1, further comprising injecting a polymer adhesive into said corners after said folding.

6. A method of constructing a universal window system, as recited in claim 1, further comprising applying a polymer to one or more of said plurality of elongated sections to restore said elongated section.

7. A method of constructing a universal window system, as recited in claim 1, further comprising punching a hole in an elongated section for ventilation and routing.

8. A method of constructing a universal window system, as recited in claim 1, wherein at least two of said elongated sections have non-uniform lengths prior to folding and uniform lengths after folding.

9. A method of constructing a universal window system, as recited in claim 1, wherein the number of elongated sections is at least three.

10. A method of constructing a universal window system, as recited in claim 1, wherein said affixing step is performed with a chemical adhesive.

11. A method of constructing a universal window system, as recited in claim 1, wherein said affixing step is performed with a metallurgical process.

12. A method of constructing a universal window system, as recited in claim 1, wherein said affixing step is performed with mechanical fasteners.

13. An automated method for manufacturing high quality window systems, comprising:
(A) receiving a data profile into a processor, said data profile including information defining a shape and finished dimensions for a window component;
(B) computing a notching sequence for a device to notch a length of construction material in one or more locations based on said shape and finished dimensions, said notching sequence including a stretch tolerance of up to about 0.5 inches per notch to be folded;
(C) activating a cutter to perform cutting operations on said construction material according to said notching sequence;
(D) folding said construction material to form a corners of said one or more locations on said construction material; and
(E) affixing said construction material in said shape.

14. An automated method for manufacturing high quality window systems, as recited in claim 13, further comprising applying an identification marking to said construction material to facilitate tracking window components throughout said window-manufacturing process.

15. An automated method for manufacturing high quality window systems, as recited in claim 13, wherein said stretch tolerance is at least about 0.03 inches per finished dimension between notches.

16. An automated method for manufacturing high quality window systems, as recited in claim 13, wherein said data profile further comprises data for material texture.

17. An automated method for manufacturing high quality window systems, as recited in claim 13, further comprising sealing said corner.

18. An automated method for manufacturing high quality window systems, as recited in claim 13, further comprising drilling said construction material.

19. A method for manufacturing a window system, comprising:
(A) receiving a piece of construction material, having a first end and a second end, wherein said first end and said second each have a diagonal sloped portion, which when said single piece of construction material is folded from a diagonal joint at said first end and said second end;
(B) notching said construction material at intervals calculated to include a stretch tolerance of up to about 0.5 inches per notch to be folded;
(C) folding said notched construction material;
(D) joining said first end to said second end, using one or more joining components.

20. A method for manufacturing a window system, comprising:
(A) receiving a single piece of construction material, having a first end and a second end,
(B) notching said construction material, using a three-way notching system of calculated points of origin, wherein the distance between said calculated points for notching can be increased or reduced to form a wide range of various window shapes and sizes, said distance between said calculated points for notching being reduced by up to about 0.5 inches per notch to be folded;
(C) folding said notched construction material; and
(D) joining said first end to said second end.

21. A method for manufacturing a window system, using a singular form of construction material, comprising:
(A) receiving a single piece of construction material, having a first end and a second end;
(B) notching said construction material, using a three-way notching system of calculated points of origin, wherein said calculated points for notching can be increased or reduced to form a wide range of various window component shapes and sizes, said distance between said calculated points for notching being reduced by up to about 0.5 inches per notch to be folded;

(C) folding said notched construction material;

(D) joining said first end to said second end, using one or more joining components of a second construction material.

22. A method for manufacturing a window system, comprising:

(A) receiving construction materials having a first end and a second end;

(B) notching said received construction materials at angles selectable from 0 degree to 180 degrees at said first and second ends and at least two intermediate points to form window system components for a wide range of various window shapes and sizes, the distance between said first end a first of said two intermediate points being reduced by up to about 0.25 inches and the distance between said at least two intermediate points being reduced by up to about 0.5 inches to compensate for stretching of said materials at said at least two intermediate points during folding;

(C) folding said notched construction materials at said at least two intermediate points; and (D) affixing said notched construction materials in one of various predetermined shapes.

23. A method of constructing a window system, comprising:

(A) receiving materials for processing;

(B) cutting said materials in a plurality of locations to form a plurality of connected elongated sections, said elongated sections each having a first end, a second end, an interior side and an exterior side, at least one of said first and second ends of an elongated section being formed complementary to at least one of said first and second ends of an adjacent elongated section, the length of a first of said plurality of elongated sections being calculated to allow up to about 0.25 inches of stretch during folding and the length of a second of said plurality of elongated sections being calculated to allow up to about 0.5 inches of stretch during folding;

(C) folding said plurality of elongated sections so that adjacent first and second ends of elongated sections form one or more corners; and (D) affixing said plurality of elongated sections at said one or more corners.

24. A method for manufacturing a window system, comprising:

(A) receiving a construction material;

(B) notching said construction material at a plurality of intervals wherein a first of said intervals is reduced from a first desired finished dimension by up to about 0.25 inches and a second of said intervals is reduced form a second desired finished dimension by up to about 0.5 inches;

(C) folding said notched construction material to achieved said first and second desired finished dimensions of a desired shape;

(D) affixing said construction material in said shape using one or more joining components, thereby forming a window system having an inner surface adapted for holding a transparent medium in place and an outer surface adapted for being received into a window opening in a structure and wherein said outer surface of said window system includes a nail fin.

* * * * *

UNITED STATES PATENT AND TRADEMARK OFFICE

CERTIFICATE OF CORRECTION

PATENT NO. : 7,117,576 B2
APPLICATION NO. : 10/175021
DATED : October 10, 2006
INVENTOR(S) : Frank LaSusa It is certified that error appears in the above-identified patent and that said Letters Patent is hereby corrected as shown below:

Title Page, item (63), application data should read

Related U.S. Application Data

(63) Continuation-in-part of application No. 09/679,220, filed on Oct. 3, 2000, now Pat. No. 6,687,934.

Signed and Sealed this

Twentieth Day of October, 2009

David J. Kappos

David J. Kappos
*Director of the United States Patent and Trademark Office*